Patented June 3, 1924.

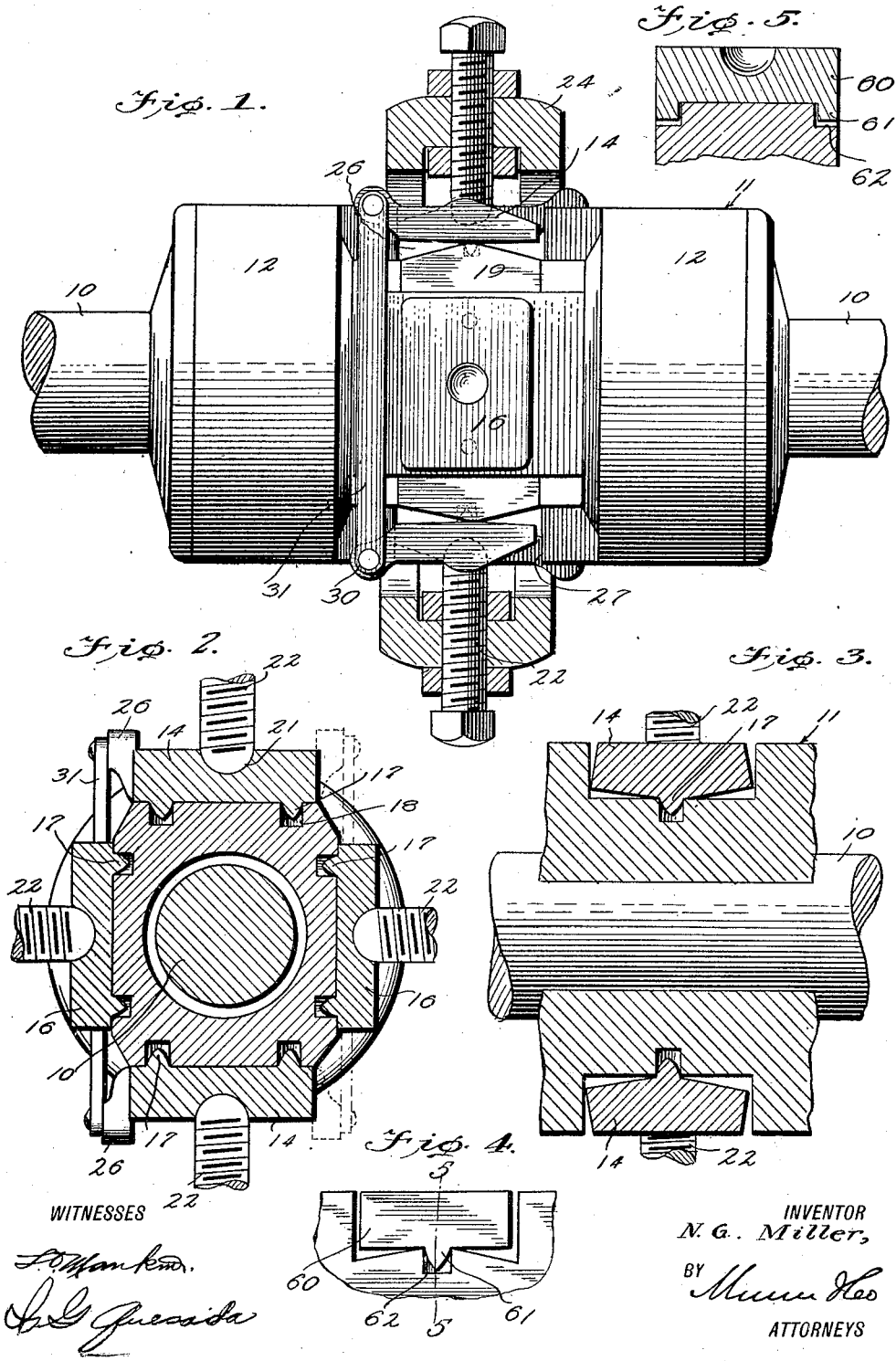

1,496,163

UNITED STATES PATENT OFFICE.

NILS GUNNAR MILLER, OF WORCESTER, MASSACHUSETTS.

BEARING.

Application filed April 2, 1921. Serial No. 457,856.

*To all whom it may concern:*

Be it known that I, NILS GUNNAR MILLER, a citizen of Sweden, and a resident of Worcester, in the county of Worcester and State of Massachusetts, have invented certain new and useful Improvements in Bearings, of which the following is a specification.

This invention relates to bearings especially adapted for supporting shafts of various natures.

Briefly stated an important object of this invention is to provide novel means whereby a bearing casing is permitted to automatically adjust itself to deflections in the shaft or spindle due to excessive belt strains, unbalanced pulleys, sprung shafts, sagging of supporting girders or the like.

Other objects and advantages of the invention will be apparent during the course of the following description.

In the accompanying drawing forming a part of this application and in which like numerals are employed to designate like parts throughout the same;

Figure 1 is a side elevation of the improved bearing casing applied;

Figure 2 is a vertical sectional view through the same;

Figure 3 is a detailed sectional view taken at right angles to Figure 2;

Figure 4 is a detail elevation of a slightly modified form of invention;

Figure 5 is a detailed sectional view taken on line 5—5 of Figure 4.

In the drawing, wherein for the purpose of illustration is shown a preferred embodiment of the invention, the numeral 10 designates a power transmitting shaft which may be employed in any desired capacity and which is supported by means of one or more bearings confined within bearing casings generally designated by the numeral 11. The bearing casing is illustrated in Figure 1 as including a pair of aligned housings 12 within which ball bearings are arranged. This construction is, however, shown merely for the purpose of illustrating the application and use of the improved means for permitting the bearing to adjust itself to deflections in the shaft due to belt strains and the like.

The intermediate portion of the bearing casing 11 is surrounded by pairs of oppositely arranged rocker plates 14 and 16 which are provided with spaced inwardly directed pins 17 received within recesses 18 formed in the outer portions of ribs or projections 19 on the intermediate portion of the casing.

The rocker plates 14 and 16 are provided in their outer sides with semi-spherical recesses 21 which receive the rounded forward ends of set screws or bolts 22. The bolts or set screws 22 are threaded through a hanger or frame 24 which is secured to any convenient stationary support. As illustrated in Figure 2 the set screws 22 are arranged about the four sides of the casing and having their rounded forward ends received within the recesses 21 so that the casing is permitted to tilt to adjust itself to deflections of the shaft.

In use the shaft 10 may bend either about the axis of the horizontal set screws or about an axis passing through the vertical set screws. The projections 19 formed on the sides of the casing may be provided with inclined side walls 26 which co-operate with the inner faces of the rocker plates so as to limit the tilting or bending of the shaft. However the inclination of the side walls 26 may be decreased by correspondingly increasing the inclination of the opposed faces of the rocker plates 14 and 16. Also the surfaces of the projections 19 may be perfectly flat, in which case the opposed faces of the rocker plates would be V-shaped in cross section.

As illustrated in Figures 2 and 3 the pairs of conical pins 17 which are received within the recesses 18 are disposed in the plane of the set screws 22 so as to permit the plates 14 and 16 to rock within certain limits. The cone-shaped projections 17 also prevent the bearing casing from shifting either to the right or left bodily.

Pairs of shoulders 27 are arranged at the ends of the rocker plates 14 so as to form stops co-operating with the faces of the projections 19 in limiting the tilting motion of the bearing casing. The rocker plates 14 are formed with ears 30 to which a link 31 is connected so as to render the tilting of the rocker plates uniform. In carrying out the invention the links 31 which serve as a means for connecting the rocker plates 14 may be increased in number.

In carrying out the invention the bearings may be either plain journal bearings, roller bearings or ball bearings.

In the form of the invention illustrated in Figures 4 and 5 the rocker plates designated by the numeral 60 may be provided with V-shaped ribs 61 received within corresponding grooves 62 in the casing.

It is to be understood that the form of the invention herewith shown and described is to be taken as a preferred embodiment of the invention and that such minor changes in arrangement and construction of parts may be made as will remain within the spirit of the invention and the scope of what is claimed.

I claim:

1. The combination with a bearing casing, of rocker plates arranged about the same, the opposed faces of said casing and said plates being formed with opposite inclinations and with interfitting projections and recesses by means of which the casing may rock with relation to the plates, the opposed faces of said casing and said plates being adapted to contact when the casing is rocked.

2. The combination with a bearing casing, of rocker plates tiltably supporting the same, means tiltably supporting said rocker plates, and links connecting said plates for movement together.

3. The combination with a bearing casing having its intermediate portion formed with spaced recesses, of rocker plates having projections received within said recesses, and set screws connected to said rocker plates in the plane of said projections.

4. The combination with a bearing casing having its intermediate portion formed with recesses, of rocker plates having pairs of spaced cone-shaped pins received within said recesses and rockably connecting said plates to said casing, the outer sides of said plates being formed with recesses in the plane of said pins, and supporting devices having rounded ends received within said second named recesses.

5. The combination with a bearing casing having its intermediate portion formed with recesses, of rocker plates having pairs of spaced cone-shaped pins received within said recesses and rockably connecting said plates to said casing, the outer sides of said plates being formed with recesses in the plane of said pins, a supporting member having set screws received within said second named recesses, links connected to certain of said rocker plates whereby the rocker plates operate in unison, said casing being provided with oppositely arranged shoulders limiting the tiltng movement of certain of said rocker plates.

6. The combination with a bearing casing, of rocker plates arranged about the same, the opposed faces of said casing and said plates being formed with opposite inclinations and with interfitting projections and recesses by means of which the casing may rock with relation to the plates, and means connecting certain of the plates for movement together.

7. The combination with a bearing casing, of rocker plates arranged about the casing, the plates and the casing being formed with interfitting projections and recesses by means of which the casing may rock with relation to the plates.

NILS GUNNAR MILLER.